(12) United States Patent
Liu et al.

(10) Patent No.: US 7,540,759 B2
(45) Date of Patent: Jun. 2, 2009

(54) ENVIRONMENTALLY SEALED TERMINATING DEVICE AND SEALING GEL

(75) Inventors: Ziwei Liu, Ft. Worth, TX (US); Paul J. Huspeni, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 658 days.

(21) Appl. No.: 10/948,517

(22) Filed: Sep. 23, 2004

(65) Prior Publication Data

US 2006/0063417 A1 Mar. 23, 2006

(51) Int. Cl.
*H01R 4/24* (2006.01)
(52) U.S. Cl. ..................................................... 439/409
(58) Field of Classification Search ................. 439/409, 439/417; 379/413.04; 524/267, 268; 156/48, 156/49; 525/191, 232; 528/15
See application file for complete search history.

(56) References Cited

U.S. PATENT DOCUMENTS

| | | | | |
|---|---|---|---|---|
| 4,824,390 A | | 4/1989 | Crane et al. | 439/271 |
| 5,246,383 A | | 9/1993 | Shimirak et al. | 439/521 |
| 5,376,019 A | | 12/1994 | Shimirak et al. | 439/521 |
| 5,427,547 A | | 6/1995 | Shimirak et al. | 439/521 |
| 5,571,853 A | * | 11/1996 | Ikeno et al. | 524/268 |
| 5,595,504 A | | 1/1997 | Muller | 439/521 |
| 6,001,943 A | * | 12/1999 | Enami et al. | 528/15 |
| 6,020,409 A | * | 2/2000 | Alvarez et al. | 524/267 |
| 6,224,419 B1 | | 5/2001 | Tucker et al. | 439/521 |
| 6,500,020 B2 | | 12/2002 | Vo et al. | 439/409 |
| 6,560,334 B1 | | 5/2003 | Mullaney et al. | 379/413.04 |
| 6,811,430 B1 | * | 11/2004 | Carrico et al. | 439/409 |
| 7,056,147 B2 | * | 6/2006 | Arias et al. | 439/417 |
| 2001/0053625 A1 | | 12/2001 | Vo et al. | |

FOREIGN PATENT DOCUMENTS

EP 0903378 A1 3/1999

\* cited by examiner

*Primary Examiner*—Alexander Gilman
(74) *Attorney, Agent, or Firm*—John H. Vynalek (57) ABSTRACT

A terminating device for terminating subscriber wiring to pairs of insulation displacement type conductive contacts includes a protective sealing gel disposed within the terminating device. The gel encapsulates the conductive contacts and is characterized by a dynamic storage modulus G' and a dynamic loss modulus G" expressed in dynes/cm$^2$ having a dynamic crossover point between about 1 rad/sec and about 20 rad/sec at any temperature in the range between about $-40°$ C. to about 80° C. The loss modulus G" is greater than the storage modulus G' at a shear frequency greater than the dynamic crossover point and is less than the storage modulus G' at a shear frequency less than the dynamic crossover point. The gel has an ultimate elongation greater than about 1000%, an ultimate tensile strength greater than about 2 psi, and a cone penetration value expressed in tenths of a millimeter between about 255 and 265.

12 Claims, 9 Drawing Sheets

ENVIRONMENTALLY SEALED TERMINATING DEVICE AND SEALING GEL

BACKGROUND OF THE INVENTION

1. Field of the Invention

The present invention relates to an environmentally sealed terminating device, and in particular to a terminating device sealed with a protective silicone gel.

2. Technical Background

A communications service provider, such as a telephone company, may offer both voice and data transmission services over a communications network. Customers of the service provider, commonly referred to as "subscribers," may purchase as many communications services as they desire and equip their homes, businesses, or the like with equipment to utilize such services. Subscribers are responsible for proper operation of the equipment and the service provider is responsible for proper operation of the communications network up to the interface, commonly referred to as the "demarcation point," between the service provider wiring and the subscriber wiring. The demarcation point is accessible to both the subscriber and the service provider and is typically located at the subscriber site in a network interface device (NID) or building entrance terminal (BET) mounted on the exterior wall of a residential or commercial building, such as a home, apartment, office, or the like.

The NID or BET houses at least one, and typically, a plurality of wire terminating devices for interconnecting the service provider wiring with the subscriber wiring. As used herein, "terminating device" is intended to include any type of connector for interconnecting service provider wiring with subscriber wiring, configured with or without a protection element for protecting against a voltage and/or current surge, including but not limited to a line module, a protected terminating device (PTD), or the like. The terminating device includes one or more pairs of termination sites for the service provider wiring and one or more pairs of termination sites for the subscriber wiring. The terminating device typically further includes some type of electrical circuitry, for example a half-ringer or printed circuit board, and/or an electrical protection component, for example a metal oxide varistor (MOV) or gas tube, that is interconnected between the service provider wiring and the subscriber wiring. The termination sites for the service provider wiring are typically provided adjacent one end of the terminating device beneath a locked cover that is accessible only to service provider personnel. The termination sites for the subscriber wiring are typically provided adjacent the other end of the terminating device and are accessible to both the service provider personnel and the subscriber. The NID or BET may be further provided with an outer cover that is accessible to both service provider personnel and the subscriber, but is not accessible to unauthorized persons.

The NID or BET may be exposed to dust, dirt, moisture and other deleterious environmental effects. Accordingly, it is desirable to seal the termination sites to protect the terminating device from failure. When a terminating device fails, the subscriber is no longer able to access the communications network. Further, the service provider must dispatch a technician to the subscriber site to repair or replace the terminating device, at significant expense to the service provider. Terminating devices are available that utilize insulation displacement contacts and wire insertion holes on the side or the rear that may be sealed with a viscous, non-porous gel to protect the wire terminations, electrical circuitry and electrical components within the terminating device. A particularly effective terminating device is disclosed in U.S. Pat. No. 6,500,020 to Chanh, the contents of which are incorporated herein by reference.

In spite of the advances in the designs of terminating devices, the protecting gels utilized thus far have either been too fluid to be retained within the terminating device without leakage, or lack visco-elastic properties that permit proper connection of the provider or subscriber wiring within the terminating device. For example, in the embodiments of the terminating device disclosed in U.S. Pat. No. 6,500,020, a protecting gel that is too stiff impedes the movement of the actuating components and therefore requires an excessive force to terminate the wiring within the conductive contacts. However, a protecting gel that is too elastic generates an excessive restoring force that prevents proper or consistent termination of the wiring. It would therefore be desirable to develop a gel that does not leak from the terminating device, yet has visco-elastic properties that permit ready termination of the provider and subscriber wiring and other operation of the terminating device.

SUMMARY OF THE INVENTION

In one broad aspect, the invention is embodied in a terminating device comprising a base, at least one pair of insulation displacement contacts disposed within the base, a means for engaging at least one conductive wire in a corresponding one of the insulation displacement contacts, and a sealing gel encapsulating the at least one pair of insulation displacement contacts. The gel has a dynamic storage modulus $G'$ and a dynamic loss modulus $G''$, both expressed herein in dynes/$cm^2$, and further exhibits a dynamic crossover point expressed herein in rad/sec. The dynamic crossover point of the gel is between about 1 rad/sec and 20 rad/sec at any temperature within the range between about $-40°$ C. to $80°$ C. Within the specified temperature range, the loss modulus $G''$ is greater than storage modulus $G'$ at a shear frequency greater than the dynamic crossover point and $G''$ is less than $G'$ at a shear frequency less than the dynamic crossover point. Preferably, the dynamic crossover point is between about 5 rad/sec and about 20 rad/sec.

At low shear frequencies (e.g. less than about 0.5 rad/sec), the dynamic storage modulus $G'$ is preferably greater than about 800 dynes/$cm^2$ at $30°$ C., more preferably between about 800 dynes/$cm^2$ and 1200 dynes/$cm^2$, and the dynamic loss modulus $G''$ is less than about 300 dynes/$cm^2$. Preferably, the dynamic storage modulus $G'$ is between about 600 dynes/$cm^2$ and 1200 dynes/$cm^2$ at a shear frequency of about 1 rad/sec at every temperature over a range between about $-40°$ C. and $80°$ C., and tan $\delta$ is preferably less than about 1 over the same temperature range, where tan $\delta$ is the ratio of the loss modulus $G''$ to the storage modulus $G'$ (tan $\delta = G''/G'$). At high shear frequencies (e.g. greater than about 100 rad/sec), the loss modulus $G''$ is preferably greater than the storage modulus $G'$, and tan $\delta$ is greater than about 1.1.

The protecting gel preferably has a relaxation time less than about 0.5 seconds at a temperature of about $30°$ C. Preferably, the gel has an ultimate elongation greater than about 1000% and an ultimate breaking strength greater than about 2 psi. It is further desirable that the gel has a cone penetration value between about 255 and 265, measured as tenths of a millimeter.

In another broad aspect of the invention, a silicone environmental sealing gel for a terminating device is provided comprising a vinyl-functionalized silicone fluid in an amount between about 10% and 20% by weight, a hydro-functionalized silicone fluid in an amount between about 2% and 10% by weight, a plasticizer in an amount between about 70% and 88% by weight, and a platinum vinyl complex in vinyl silicone fluid in an amount between about 0.001% and 0.1% by weight.

The sealing gel is characterized by a dynamic crossover point between about 1 rad/sec and 20 rad/sec at any temperature in the range between about −40° C. to 80° C., a dynamic loss modulus G" greater than a dynamic storage modulus G' at a shear frequency greater than the dynamic crossover point and less than the dynamic storage modulus G' at a shear frequency less than the dynamic crossover point at any temperature in the specified temperature range, an ultimate elongation greater than about 1000%, an ultimate tensile strength greater than about 2 psi, and a cone penetration value expressed in tenths of a millimeter between about 255 and 265 at 23° C. Preferably, the dynamic crossover point is between about 5 rad/sec and about 20 rad/sec.

The storage modulus G' is preferably between about 800 dynes/cm$^2$ and 1200 dynes/cm$^2$ at a shear frequency less than about 0.5 rad/sec and a temperature at about 30° C. The loss modulus G" is preferably less than about 300 dynes/cm$^2$. Preferably, the storage modulus G' is between about 600 dynes/cm$^2$ and 1200 dynes/cm$^2$ at a shear frequency of about 1 rad/sec and at any temperature in the range between about −40° C. and 80° C., and tan δ is less than about 1.0.

At a shear frequency greater than about 100 rad/sec, tan δ is preferably greater than about 1.1 at a temperature of about 30° C. Preferably, the stress relaxation time is less than about 0.5 seconds at 30° C.

Preferably, the vinyl-functionalized silicone fluid has a molecular weight greater than about 17,000. The hydro-functionalized silicone fluid preferably has a molecular weight greater than about 3000.

In yet another broad aspect of the invention, the invention is embodied in a method of environmentally sealing a terminating device comprising providing a terminating device having a base, at least one pair of insulation displacement contacts disposed within the base, and a means for engaging at least one conductive wire in a corresponding one of the insulation displacement contacts. The method further includes encapsulating the at least one pair of insulation displacement contacts with a silicone environmental sealing gel characterized by a dynamic crossover point between about 1 rad/sec and 20 rad/sec at any temperature in the range between about −40° C. to about 80° C., a dynamic loss modulus G" greater than a dynamic storage modulus G' at a shear frequency greater than the dynamic crossover point and less than the dynamic storage modulus G' at a shear frequency less than the dynamic crossover point at any temperature in the range between about −40° C. to about 80° C., an ultimate elongation greater than about 1000%, an ultimate tensile strength greater than about 2 psi, and a cone penetration value expressed in tenths of a millimeter between about 255 and 265 at 23° C.

The invention will be understood more easily and other objects, characteristics, details and advantages thereof will become more clearly apparent in the course of the following explanatory description, which is given, without in any way implying a limitation to the intended scope of the invention, with reference to the attached drawings.

DETAILED DESCRIPTION OF THE INVENTION

FIGS. 1-5 illustrate an exemplary customer bridge as disclosed in U.S. Pat. No. 6,500,020, indicated generally by reference numeral 20. Embodiments of the present invention shall be described with reference to exemplary customer bridge 20. However, the skilled artisan will realize that the protective sealing gel according to the present invention is equally suitable for other terminating device designs, and customer bridge 20 should not be considered limiting in this regard.

Customer bridge 20 is sometimes referred to in the art as an interconnect module, a connector module, a terminating module, or a wiring module. As used herein, the term "customer bridge" is intended to include any apparatus for terminating provider and subscriber wiring in a communications network, including but not limited to an interconnect module, a connector module, a wiring module, or a customer bridge. In the exemplary embodiment illustrated and described herein, customer bridge 20 is used to terminate subscriber wiring in a conventional terminating device, such as a line module, PTD, or the like, that is housed in a conventional NID or BET in a telecommunications network.

Figure 4:
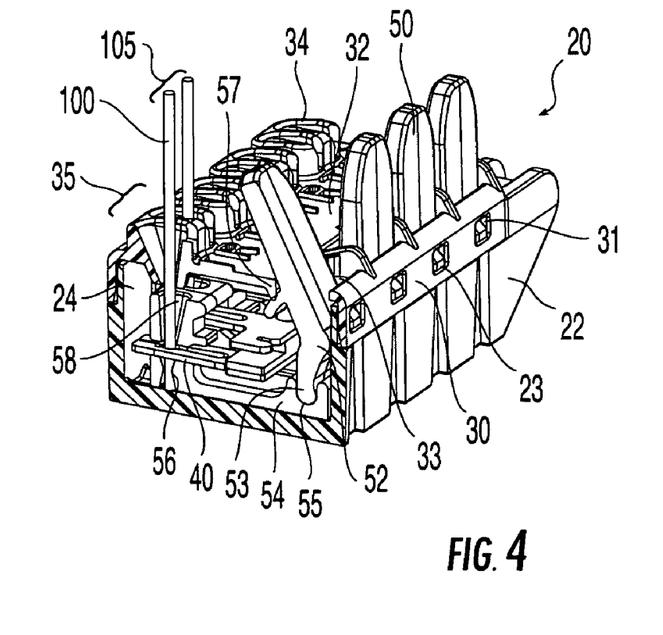
FIG. 4 is a sectioned perspective view taken along line 4-4 of FIG. 2 showing the customer bridge with subscriber wiring inserted at one of the termination sites, and with the corresponding actuating arm in a first, disconnected position.
Figure 5:
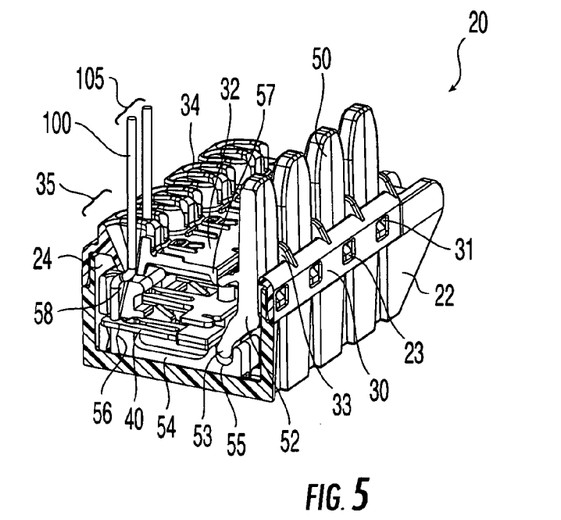
FIG. 5 is a sectioned perspective view taken along the line 5-5 of FIG. 2 showing the customer bridge with subscriber wiring inserted at one of the terminations sites, and with the corresponding actuating arm in a second, connected position.

Customer bridge 20 comprises base 22 and base cap 30 attached to the base. Base 22 is generally hollow and defines an interior cavity 24 (FIGS. 4 and 5). Base cap 30 is attached to the upper edge of base 22 such that the base cap substantially covers, and thereby encloses, cavity 24. Base cap 30, for example, may be provided with apertures 31 that cooperate in a conventional manner with projecting tabs 23 formed on base 22 to secure the base cap onto the base. However, the base cap may be secured to the base in any manner that facilitates manufacture and assembly of customer bridge 20. Base 22 further comprises a hinge 26 for receiving removable cover 60 (FIG. 1) and a mounting tab 28 (FIG. 1) for removably mounting the customer bridge 20 on a terminating device, such as a line module 110 (FIG. 13) or PTD 120 (FIG. 14), as will be described in greater detail hereinafter. Customer bridge 20 may be used in either an indoor or an outdoor application. However, customer bridge 20 is particularly useful in outdoor applications where the NID or BET is subjected to vibration, shock, dust, dirt, moisture or other deleterious environmental effects. Accordingly, cavity 24 defined by base 22 may be filled with a dielectric sealant, such as a grease or a viscous gel, to protect the components housed within the base from excessive vibration, shock or exposure to adverse environmental effects, such as dust, dirt or moisture from rain or melting snow. The term "gel" has been used in the prior art to cover an array of materials from greases to fluid-extended polymeric systems. As used herein, a polymer "gel" is a cross-linked solution having substantially no steady state flow, whether linked by chemical bonds or crystallites or some other kind of junction. The absence of the steady state flow is the key definition of the solid like properties while substantial dilution is necessary to give the relatively low modulus of a gel. The solid nature is achieved by a continuous network structure formed in the material generally through cross-linking the polymer chains through some kind of junction or the creation of domains of associated substituents of various branch chains of the polymer. The cross-linking can be either physical or chemical as long as the crosslink sites are sustained at the use conditions of the gel.

Base cap 30 comprises a top surface 32 (FIG. 2) opposite cavity 24 defined by base 22. Top surface 32 has at least one wire insertion hole 34 formed therethrough and extending into cavity 24. The wire insertion hole 34 is sized to receive a conductive wire 100 therein. Preferably, the conductive wire 100 has a thickness of between about 18 and about 24 AWG. Most preferably, however, the conductive wire 100 has a thickness of between about 22 and about 24 AWG. In the exemplary embodiments illustrated and described herein, the conductive wire 100 is a subscriber wire in a telecommunications network. As shown herein, wire insertion hole 34 comprises at least a pair of wire insertion holes 35 for receiving twisted pair tip and ring wires 105 from a subscriber's communications equipment, such as a conventional telephone handset (not shown). Preferably, base cap 30 of the customer bridge 20 has a plurality of pairs of wire insertion holes 35 for receiving a corresponding plurality of twisted pair tip and ring wires 105 to interconnect subscriber equipment with a telephone line from a service provider, such as a telephone company. As shown, base cap 30 has four pairs of wire insertion holes 35 for receiving up to four twisted pair tip and ring wires 105 that interconnect the subscriber wiring with the service provider wiring to establish voice and/or data transmission service over a communications network.

Customer bridge 20 further comprises at least one conductive contact 40 (FIGS. 4 and 5) disposed within the cavity 24 defined by the base 22. The conductive contact 40 is electrically connected to a lead wire (not shown) extending from, for example, a jack on the terminating device in a known manner. Accordingly, when a conductive wire 100 inserted in wire insertion hole 34 engages conductive contact 40, as will be described, the conductive wire is electrically connected to the lead wire. Similarly, a conductive wire from the service provider is electrically connected to a lead wire extending from the jack. Preferably, the jack comprises a subscriber conductor in electrical contact with the lead wire connected to the conductive wire 100 from the subscriber, and a service provider conductor in electrical contact with the lead wire connected to the conductive wire from the service provider. In this manner, the subscriber wiring may be selectively interconnected with the service provider wiring through the jack in a known manner. As previously described, one or more twisted pair tip and ring wires 105 are interconnected with the twisted pair tip and ring wires of the telephone line from the service provider. The conductive contact may be any suitable contact for establishing an electrical connection with the subscriber wiring. Preferably, however, conductive contact 40 is an insulation displacement contact having opposed, sharp edges for piercing the insulation surrounding conductive wire 100, and thereby establishing electrical continuity between conductive wire 100 and conductive contact 40.

Customer bridge 20 further comprises at least one wire engagement member, such as actuating arm 50, for forcing conductive wire 100 into engagement with conductive contact 40. Actuating arm 50 is disposed partially within cavity 24 defined by base 22 and partially above top surface 32 of base cap 30. As shown herein, top surface 32 of base cap 30 further has at least one opening 33 formed therethrough for receiving actuating arm 50 therein. However, actuating arm 50 may extend upwardly through base 22 or base cap 30 may have a cavity or an elongated slot formed therein to permit the actuating arm to extend upwardly from cavity 24 defined by base 22 to above top surface 32. Regardless, actuating arm 50 is accessible from immediately above top surface 32 of base cap 30. Preferably, the at least one actuating arm 50 comprises a plurality of actuating arms corresponding to the plurality of pairs of wire insertion holes 35, twisted pair tip and ring wires 105, and pairs of conductive contacts 40. As shown herein, four actuating arms 50 are provided, each corresponding to one of the four pairs of wire insertion holes 35 that receive twisted pair tip and ring wires 105.

Figure 2:
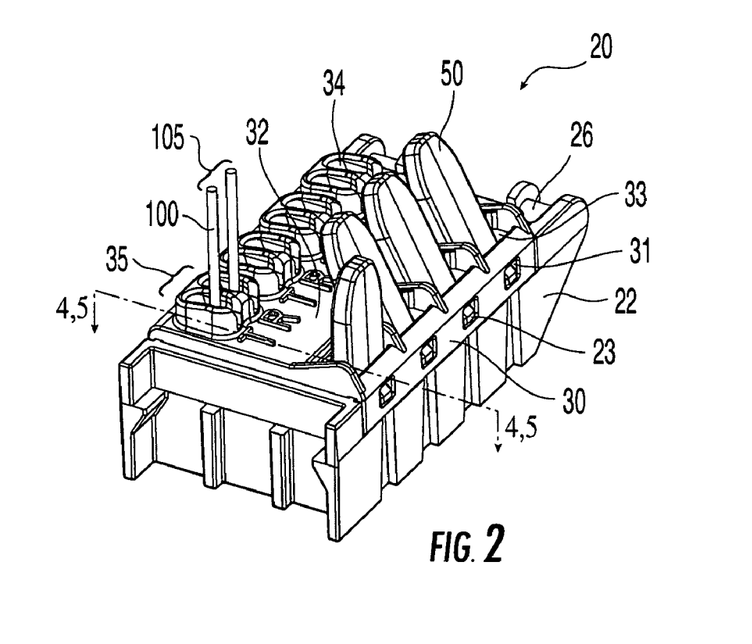
FIG. 2 is a perspective view of the customer bridge of FIG. 1 shown with the hinged cover removed for purposes of clarity.
Figure 3:
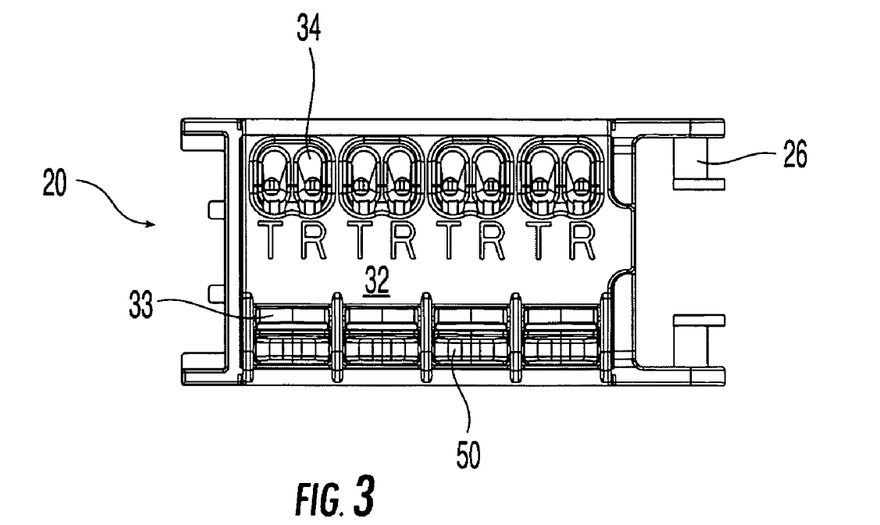
FIG. 3 is a top plan view of the customer bridge of FIG. 2.

Each actuating arm 50 comprises first portion 52 and second portion 54 pivotally attached to the first portion. Actuating arm 50 is movable between a first, disconnected position in which conductive wire 100 does not engage conductive contact 40 and a second, connected position in which conductive wire 100 engages conductive contact 40. In FIG. 2, three actuating arms 50 are shown in the disconnected position and one of the actuating arms is shown in the connected position. As shown and described here, conductive contact 40 is disposed horizontally and fixed relative to base 22 and actuating arm 50 is configured to force conductive wire 100 between the opposed, sharp edges of the insulation displacement contact. Alternatively, the conductive wire 100 could be fixed relative to base 22 and actuating arm 50 could be configured to force conductive contact 40 into engagement with conductive wire 100.

As described above, cavity 24 defined by base 22 is preferably filled with a dielectric sealant, such as a grease or a viscous gel, to protect the components housed within the base from excessive vibration, shock or exposure to adverse environmental effects, such as dust, dirt or moisture from rain or melting snow. Many prior art gels which may be used to fill cavity 24 suffer from having a viscosity too high to permit proper interaction between conductive contact 40 and conductive wire 100. For example, the viscosity of the gel may require an excessive amount of force to move actuating arm 50, thereby preventing the conductive wire 100 from engaging the conductive contact 40 or inhibiting the sharp edges of the insulation displacement type conductive contact 40 from properly piercing the insulation of the conductive wire 100. On the other hand, many prior art gels suffer from a gel having a low viscosity that is too elastic to permit proper or consistent termination. For example, the elastic memory of the gel may generate an excessive restoring force that prevents the conductive wire 100 from remaining in contact with the sharp edges of the insulation displacement type conductive contact 40. In addition, the gel may be so fluid that it seeps from the terminating device cavity under the influence of gravity, therefore eliminating the desired protective properties of the gel. It is desirable, therefore, to utilize a gel which has visco-elastic properties that prevent the gel from flowing out of the terminating device, yet allow proper interaction between the conductive wire and the conductive contact. For example, the gel may be thixotropic.

The visco-elastic properties of gel materials are directly related to their intrinsic cross linked molecular structures and dictate the rheological behavior of the gel at different temperatures and shear rates. Rheological properties of materials such as gels, polymer melts and various fluids may be measured by methods well known in the art, such as dynamic mechanical analysis (DMA) testing. For example, a strain rheometer such as the ARES rheometer manufactured by Rheometric Scientific may be used to determine some of the visco-elastic properties of gels, including the inventive gel disclosed herein. The ARES is capable of conducting many tests automatically. Properties which may be measured using the ARES rheometer include the elastic (storage) modulus $G'$, the viscous (loss) modulus $G''$, and the stress relaxation number. The stress relaxation number, as measured by the ARES rheometer, is a measure of the ability of the gel to relax any induced compression placed on the gel. A configuration utilizing 25 mm parallel plates was employed over a range of angular oscillatory velocities and shear frequencies. For the tests conducted herein, the shear frequency was swept over an angular range of 0.5 to 100 rad/s at temperatures between –40° C. and 80° C. The temperature was ramped at a rate of about 2° C./min. Dynamic strain was maintained at less than about 5%.

Additional testing may be performed using other equipment. For example, an Instron model 4469 Universal Testing Machine (Instron) may be used to perform tensile testing utilizing a modified ASTM D638 test procedure. As disclosed herein, measurements for tensile testing were conducted at a temperature of 23° C. Air grip jaws were used to grip the gel samples, the air jaws being supplied with an air pressure of 20 psi. The cross head speed was 4 in/min (10.16 cm/s). The tensile test samples were approximately 3 inches long (7.62 cm) by 0.5 inches (1.27 cm) wide, and had a thickness of 0.25 inches (0.635 cm). Gel samples were prepared by spreading the gel over release paper and curing the sample. The release paper was removed from the gauge length prior to mounting the sample in the Instron, and the Instron gripping jaws gripped the sample through the release paper attached at the ends of the gel samples. The gauge length was approximately 1 inch (2.54 cm). Tensile stress-strain curves where measured and automatically plotted using a computer attached to a load cell incorporated within the Instron apparatus.

Cone penetration tests were performed using ASTM D217-02 at 23° C. using a standard full-scale cone assembly penetrometer, Model No. 302318, manufactured by Precision Scientific, Inc. The cone was configured to free-drop into the gel sample for 5 seconds. In this instance, the gel sample was prepared in a straight-sided cylindrical container with a 4.5 inch (11.43 cm) inside diameter (ID) and a fill height of 3 inches (7.62 cm).

Figure 6:
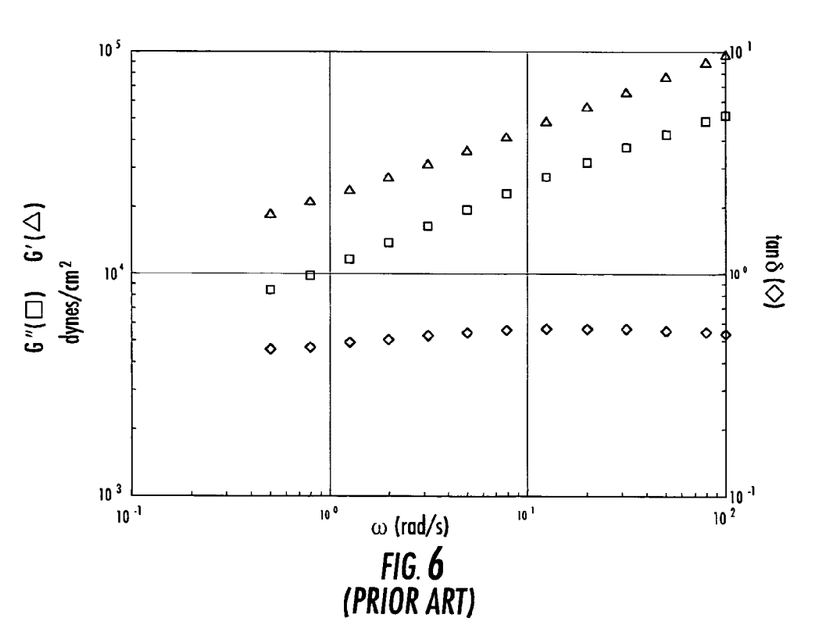
FIG. 6 is a plot of G', indicated herein by triangles, G", indicated herein by squares, and tan δ, indicated herein by diamonds, for a prior art gel as a function of shear frequency ω in rad/sec.
Figure 7A:
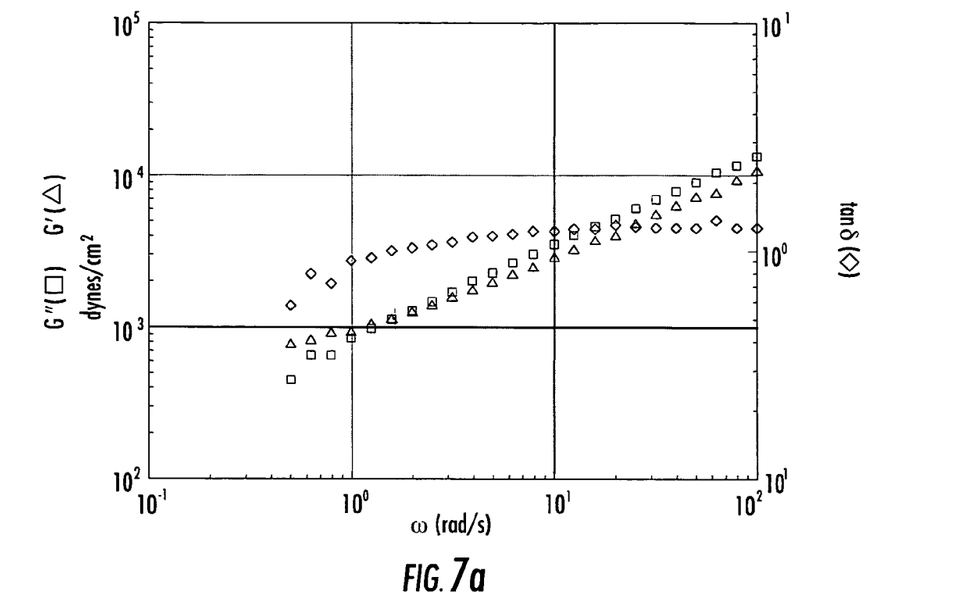
FIGS. 7a-7c are plots of G', G" and tan δ as a function of shear frequency ω in rad/sec at a temperature of about −40° C., 30° C. and 80° C. for a preferred embodiment of a gel according to the present invention.
Figure 7B:
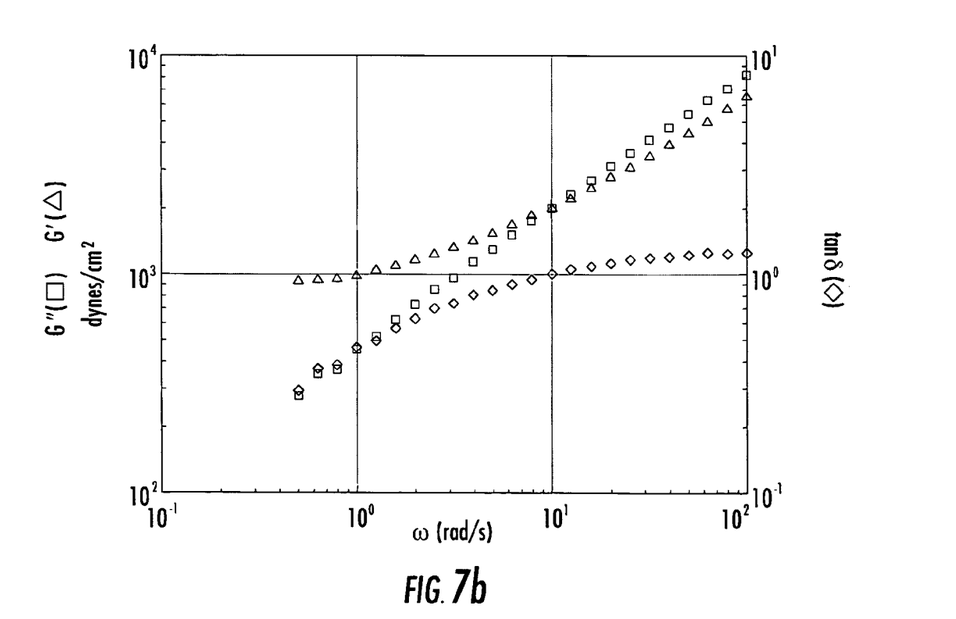
Figure 7C:
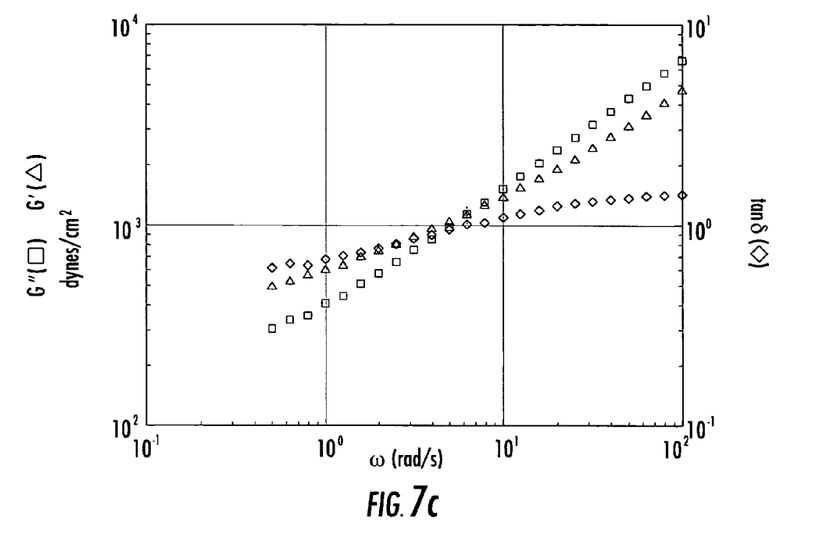
Figure 7D:
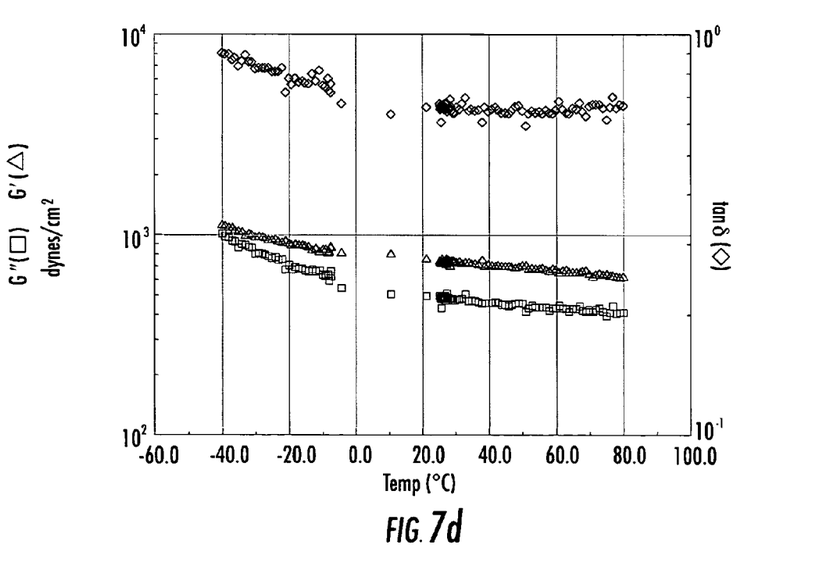
FIG. 7d is a plot of G', G" and tan δ as functions of temperature over the range between about −40° C. to about 80° C. for the gel of FIGS. 7a-7c at a shear frequency of about 1 rad/s.

FIG. 6 depicts the dynamic storage modulus $G'$ and the dynamic loss modulus $G''$ plotted as a function of angular shear frequency ω in rad/sec at a temperature of 30° C. for a gel which has been used previously as a protective sealing material in conventional terminating devices. In FIG. 6 and elsewhere herein, the storage modulus $G'$ is indicated by triangles and the loss modulus $G''$ is indicated by squares. Also shown is tan δ indicated by diamonds, where tan δ is the ratio of the loss modulus $G''$ to the storage modulus $G'$ (tan δ=$G''/G'$). As shown in FIG. 6, the storage modulus $G'$ is greater than the loss modulus $G''$ over a broad angular shear frequency spectrum between 5 rad/s and 100 rad/s. The gel represented by the data depicted in FIG. 6 has characteristics which are predominantly those of an elastic solid across the angular spectrum indicated and does not have a crossover point, which may interfere with attaining an electrical connection between conductive contact 40 and conductive wire 100. On the other hand, FIGS. 7*a*-7*c* show similar data plots for a preferred embodiment of a protective sealing gel according to the present invention at temperatures of –40° C., 30° C. and 80° C., respectively. FIG. 7*d* depicts data plots of storage modulus $G'$, loss modulus $G''$ and tan δ across the temperature range between –40° C. and 80° C. at an angular frequency of 1 rad/sec. It is noted that at very low shear frequencies (e.g. less than about 10 rad/sec at 30° C. as shown in FIG. 7*b*), the dynamic storage modulus $G'$ is greater than the dynamic loss modulus $G''$. As a result, the gel exhibits predominately elastic solid behavior at relatively low shear frequencies. However, for angular frequencies greater than about 10 rad/sec (again using FIG. 7*b* for illustrative purposes), the dynamic loss modulus $G''$ is greater than the dynamic storage modulus $G'$. Thus, the gel exhibits predominately viscous liquid properties at relatively high shear frequencies. The storage modulus $G'$ and the loss modulus $G''$ depicted in FIG. 7*b*, for example, are about equal (i.e. the plot illustrates a crossover point between storage modulus $G'$ and loss modulus $G''$) at an angular frequency of about 10 rad/s. Thus, a plot of loss modulus $G''$ for the gel according to a preferred embodiment of the invention, and a plot of the storage modulus $G'$ for the gel cross each other at about 10 rad/sec. This dynamic crossover point indicates the transition from a predominately elastic solid to a predominately viscous fluid, or vice versa, depending on the direction of change in angular shear frequency.

In one embodiment according to the present invention, the gel is an addition-cured silicone fluid composition which has been plasticized with an appropriate silicone plasticizer, such as, for example, a polydimethylsiloxane. Preferably, the inventive gel contains between about 10% and about 20% by weight of a vinyl-functionalized silicone fluid, between about 2% and about 10% by weight of a hydro-functionalized silicone fluid and between about 70% and about 88% by weight of a silicone plasticizer. In a preferred embodiment, the gel comprises about 13% by weight vinyl-functionalized silicone fluid having a molecular weight greater than about 17,000, about 8% by weight hydro-functionalized fluid having a molecular weight of at least about 3000, about 79% polydimethylsiloxane plasticizer with a molecular weight of at least about 10,000, and between about 0.001 and 0.1% by weight of a platinum vinyl complex catalyst in a vinyl silicone fluid or xylene, preferably 0.01% by weight.

Preferably, the gel according to the present invention has a dynamic storage modulus G' greater than about 800 dynes/cm2 at a shear frequency of less than about 0.5 rad/s and a temperature of about 30° C., more preferably between about 800 dynes/cm$^2$ and 1200 dynes/cm$^2$. Dynamic loss modulus G" is preferably less than about 300 dynes/cm$^2$ at a shear frequency of less than about 0.5 rad/s. At high shear frequencies (e.g. about 100 rad/sec), the loss modulus GΔ is desirably greater tan the storage modulus G', and tan δ is preferably greater than about 1.1. It is desirable that the loss modulus G" exceeds the storage modulus G' at a shear frequency greater than about 1 rad/s, more preferably between about 1 rad/s and about 20 rad/s, and most preferably between about 5 rad/s and about 20 rad/s.

Preferably, the dynamic storage modulus G' exceeds the dynamic loss modulus G" over the temperature range of –40° C. to 80° C. when measured at an angular shear frequency of about 1 rad/sec. However, it is also desirable that the dynamic storage modulus G' be greater than about 600 dynes/cm$^2$, and preferably between about 600 dynes/cm$^2$ and about 1200 dynes/cm$^2$ at any temperature in the range between –40° C. to 80° C.

It is further preferred that the stress relaxation time be less than about 0.5 seconds. Preferably, the elongation to break of the gel at a temperature of about 24° C. exceeds about 1000%, with an ultimate tensile strength greater than about 2 psi. Cone penetration expressed in tenths of a millimeter is preferably between about 255 and 265 at 30° C., and most preferably about 259.

Returning to the exemplary terminating device 20, as best shown in FIGS. 4 and 5, second portion 54 of actuating arm 50 is provided with a cam surface 55 that cooperates with pivot 53 formed at the base of first portion 52. When actuating arm 50 is moved from the disconnected position (FIG. 4) to the connected position (FIG. 5), pivot 53 of first portion 52 engages cam surface 55 of second portion 54 to drive the second portion in the direction of conductive wire 100. In the configuration shown, rotation of first portion 52 from the disconnected position to the connected position drives second portion 54 horizontally parallel to conductive contact 40 disposed within base 22 such that stop 56 formed on the end of second portion 54 forces conductive wire 100 between the opposed, sharp edges of the insulation displacement contact. If the end of the conductive wire 100 has an insulating coating, the sharp edges of the insulation displacement contact pierce the insulation and establish electrical continuity between the conductive wire and the conductive contact 40. As will be apparent to one of ordinary skill in the art, second portion 54 of actuating arm 50 corresponds to the stuffer and first portion 52 of actuating arm 50 corresponds to the screw of a conventional insulation displacement contact assembly. Preferably, base cap 30 (and/or base 22) is provided with one or more detents 57 (one shown) for positively retaining first portion 52 of actuating arm 50 in the disconnected position and/or the connected position.

Second portion 54 of actuating arm 50 has an opening 58 formed therethrough opposite wire insertion hole 34 for likewise receiving conductive wire 100 therein. Opening 58 has a generally frusto-conical shape with a larger diameter adjacent base cap 30 and a smaller diameter adjacent conductive contact 40. As actuating arm 50 moves from the disconnected position to the connected position, conductive wire 100 is crimped above conductive contact 40 and immediately below base cap 30, and movement of actuating arm 50 is substantially unimpeded by the sealing gel. As best shown in FIG. 5, conductive wire 100 is thereby securely retained within base 22 of customer bridge 20 when actuating arm 50 is in the connected position. This retention feature also prevents inadvertent insertion of conductive wire 100 when actuating arm 50 is already in the connected position. Otherwise, insertion of conductive wire 100 into the wire insertion hole 34 with actuating arm 50 already in the connected position could result in a temporary electrical connection being established between conductive wire 100 and conductive contact 40 that is lost if a pulling force is subsequently applied to the conductive wire.

Figure 8:
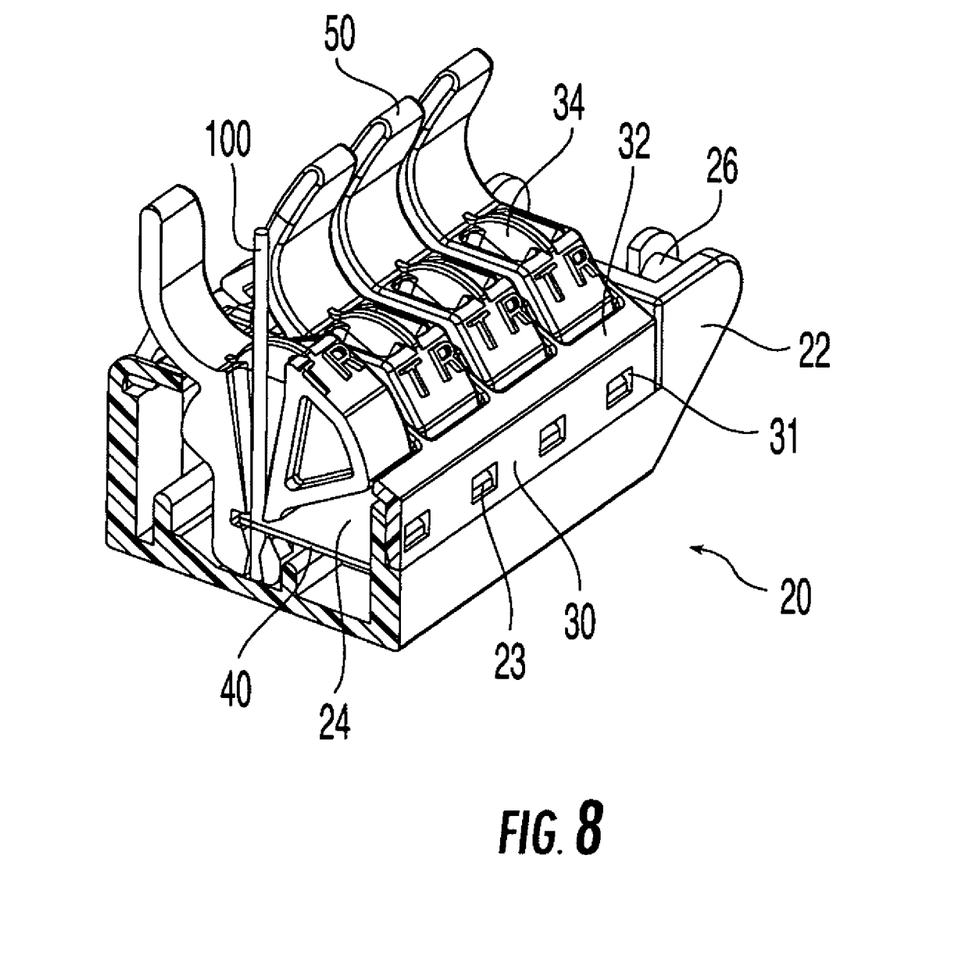
FIG. 8 is a sectioned perspective view of another embodiment of a customer bridge constructed in accordance with the invention shown with subscriber wiring inserted at one of the termination sites and with the corresponding actuating arm in the connected position.

The exemplary embodiment of customer bridge 20 illustrated in FIGS. 1-5 is termed a "switch IDC" because actuating arm 50 is in the form of a switch mechanism and the conductive contact 40 is an insulation displacement contact. FIG. 8 illustrates another exemplary embodiment of customer bridge 20 that is termed a "rocker IDC" because actuating arm 50 is in the form of a rocker mechanism and conductive contact 40 is an insulation displacement contact.

Figure 9:
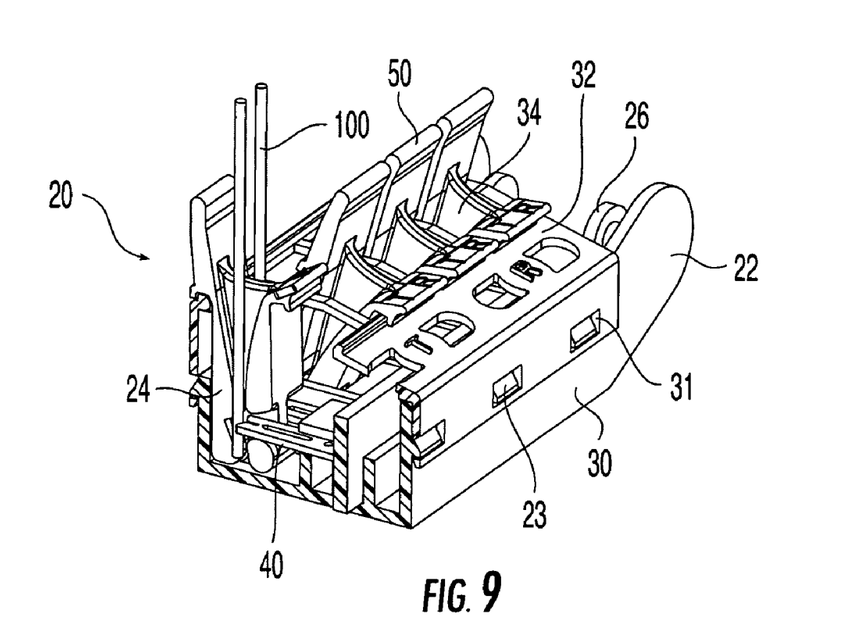
FIG. 9 is a sectioned perspective view of yet another embodiment of a customer bridge constructed in accordance with the invention shown with subscriber wiring inserted at one of the termination sites and the corresponding actuating arm in the disconnected position.

FIG. 9 illustrates still another exemplary embodiment of customer bridge 20 that is termed a "lever IDC" because actuating arm 50 is in the form of a lever mechanism and conductive contact 40 is an insulation displacement contact. Like reference numerals are utilized to indicate like or common parts in the various figures. As in FIG. 2, one of actuating arms 50 in FIG. 8 is shown in the connected position and the remaining three are shown in the disconnected position. As in FIG. 4, one of actuating arms 50 in FIG. 9 is shown in the disconnected position and the remaining three are shown in the connected position. Regardless, when actuating arm 50 is moved from the disconnected position to the connected position, conductive wire 100 is forced into engagement with the opposed, sharp edges of the insulation displacement contact 40.

Figure 1:
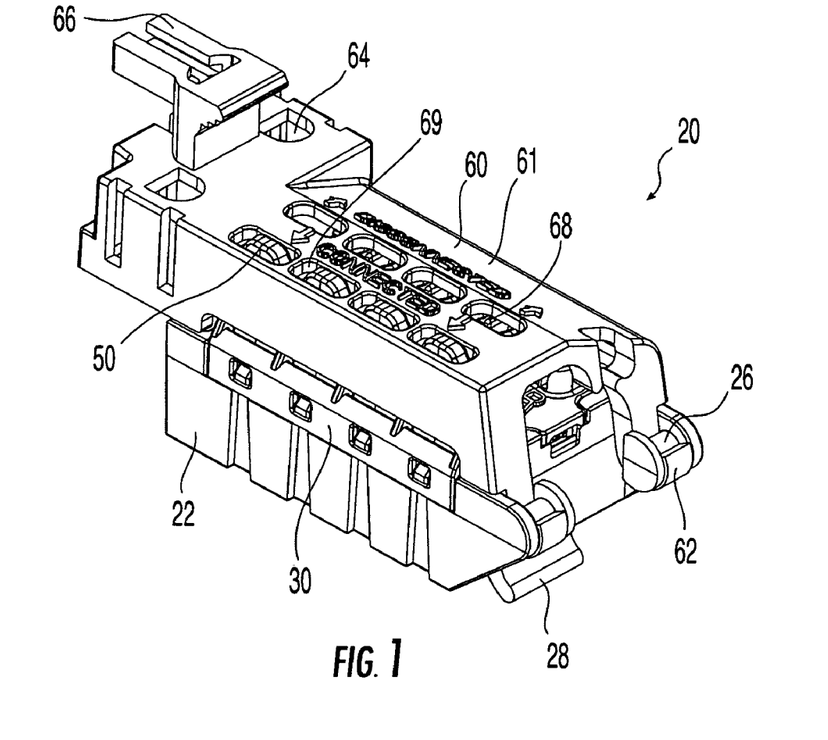
FIG. 1 is a perspective view of an exemplary customer bridge constructed in accordance with the invention.

Customer bridge 20 may further comprise cover 60 that is movable between a first, opened position and a second, closed position. Cover 60 has a pair of hinge arms 62 that cooperate with hinge 26 provided on base 22. Thus, cover 60 is rotatable between the opened and the closed positions, or may be completely removed from base 22 to provide increased access to wire insertion holes 34 and actuating arms 50 on top surface 32 of base cap 30. As shown, cover 60 further has a pair of conventional test ports 64 for receiving test contacts for verifying the integrity of the connection between the conductive wires and the conductive contacts. Cover 60 may further comprise a locking slide 66 for preventing unauthorized persons from gaining access to wire insertion holes 34 and actuating arms 50 of customer bridge 20. As shown in FIG. 1, cover 60 has a plurality of first slots 68 corresponding to the plurality of actuating arms 50 for indicating when the actuating arm is in the disconnected position. Cover 60 further has a plurality of second slots 69 corresponding to the plurality of first slots 68 and the plurality of actuating arms 50 for indicating when the actuating arm is in the connected position. Printed indicia 61 may also be provided on the top surface of cover 60 adjacent first slots 68 and second slots 69 to clarify the positions of actuating arms 50.

Figure 10:
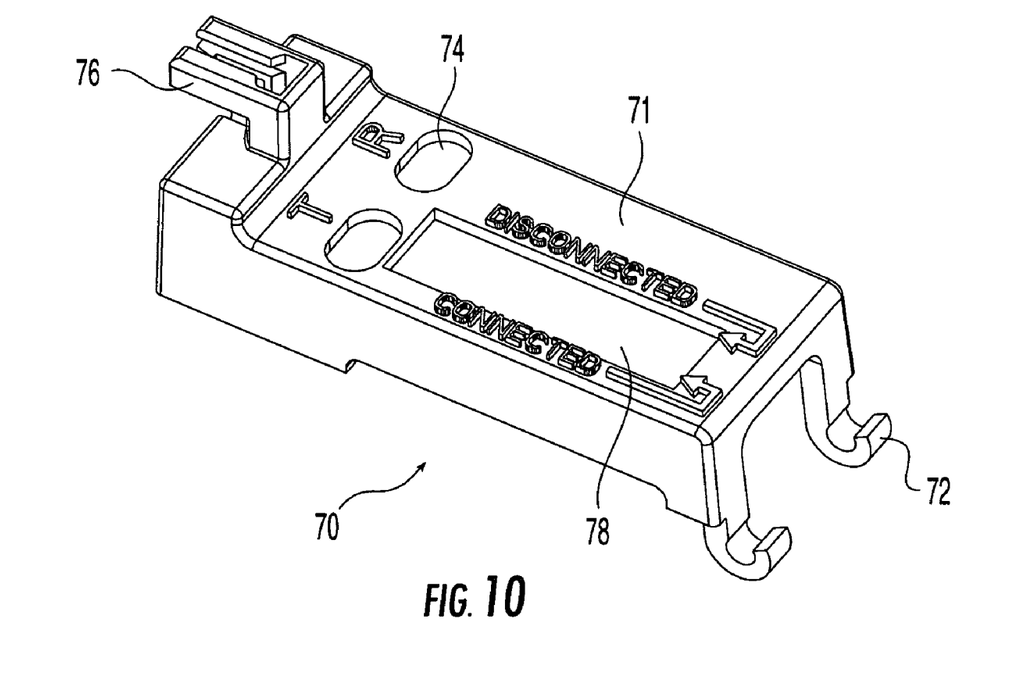
FIG. 10 is a perspective view of a first alternative embodiment of a cover for a customer bridge constructed in accordance with the invention.
Figure 11:
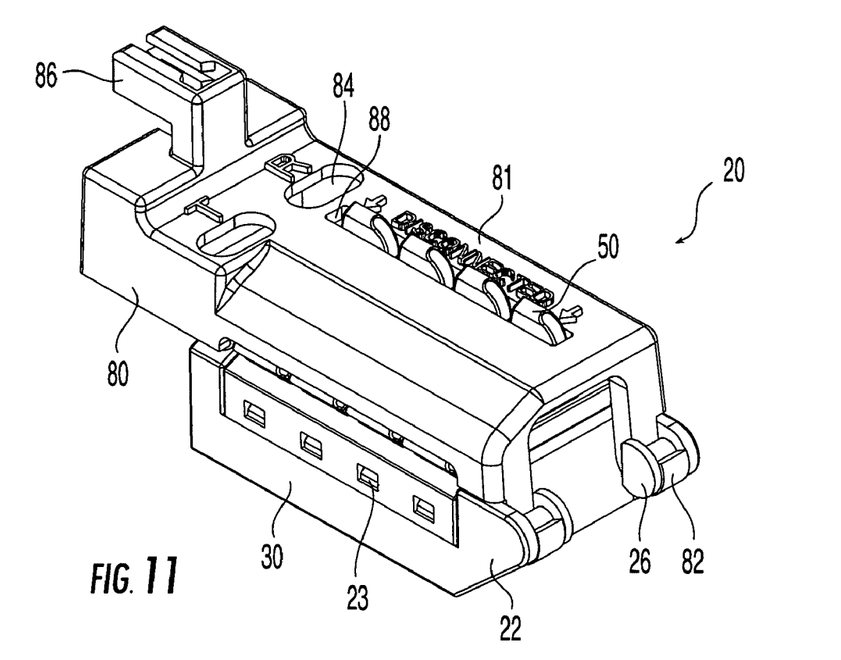
FIG. 11 is a perspective view of a second alternative embodiment of a cover for a customer bridge constructed in accordance with the invention.

FIG. 10 illustrates an alternative embodiment of a cover 70 for a customer bridge exemplified herein. Cover 70 is similar to cover 60 shown in FIG. 1 except that test ports 74 are located adjacent single elongated slot 78. Slot 78 takes the place of first slots 68 and second slots 69 of cover 60 and functions similarly to indicate whether actuating arms 50 are in the disconnected or the connected position. Printed indicia 71 may likewise be provided to clarify the position of the actuating arms. FIG. 11 illustrates another alternative embodiment of a cover 80 for a customer bridge constructed in accordance with the design exemplified herein. Cover 80 is similar to cover 60 shown in FIG. 1 except that test ports 84 are located adjacent single elongated slot 88. Slot 88 takes the place of first slots 68 or second slots 69 of cover 60 and functions similarly to indicate whether actuating arms 50 are in the disconnected or the connected position. Printed indicia 81 may likewise be provided to clarify the position of the actuating arms. As shown, printed indicia 81 and slot 88 indicate when an actuating arm 50 is in the disconnected position. Alternatively, printed indicia 81 and slot 88 may be configured to indicate when an actuating arm 50 is in the connected position.

Figure 12:
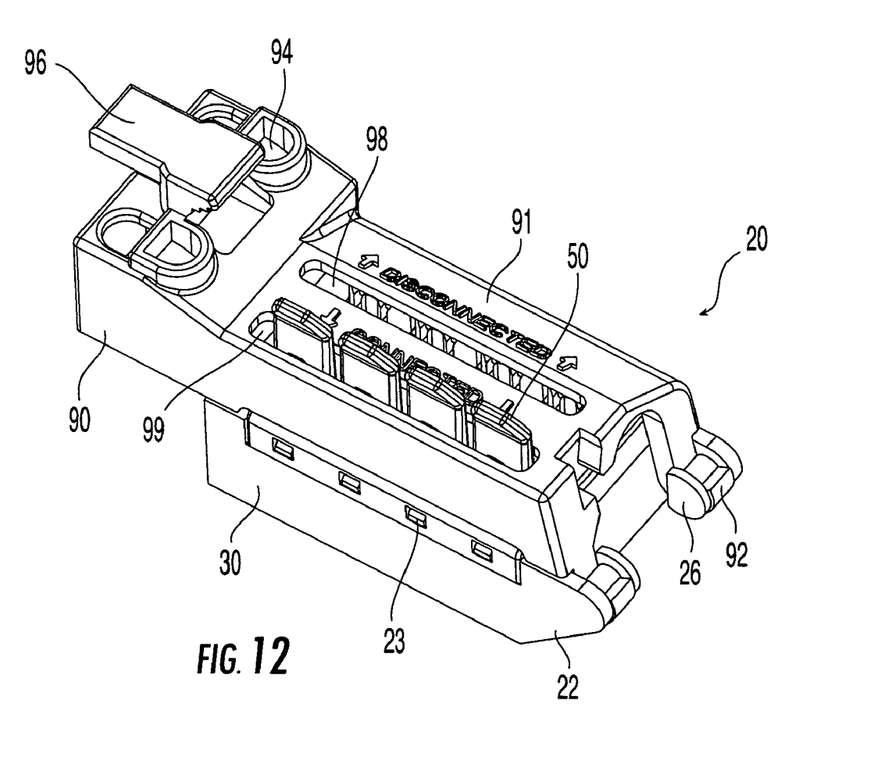
FIG. 12 is a perspective view of a third alternative embodiment of a cover for a customer bridge constructed in accordance with the invention.

FIG. 12 illustrates yet another alternative embodiment of a cover 90 for a customer bridge constructed in accordance with the design exemplified herein. Cover 90 is similar to cover 60 shown in FIG. 1 except that a pair of elongated, continuous slots 98, 99 are formed in the cover. Slots 98, 99 take the place of first slots 68 and second slots 69 of cover 60 and function similarly to indicate whether actuating arms 50 are in the disconnected or the connected position. Printed indicia 91 may likewise be provided to clarify the position of the actuating arms.

Figure 13:
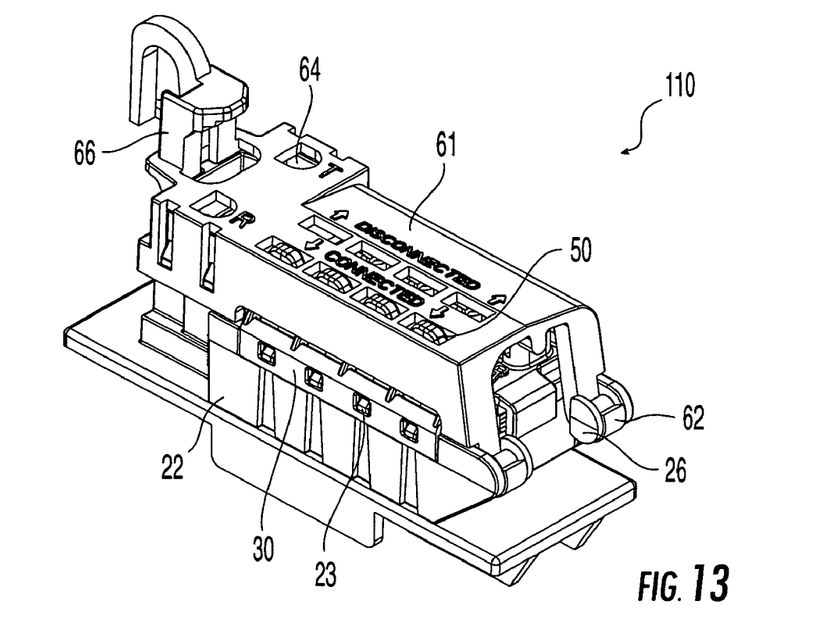
FIG. 13 is a perspective view of a customer bridge constructed in accordance with the invention removably mounted on a conventional telephone line module.
Figure 14:
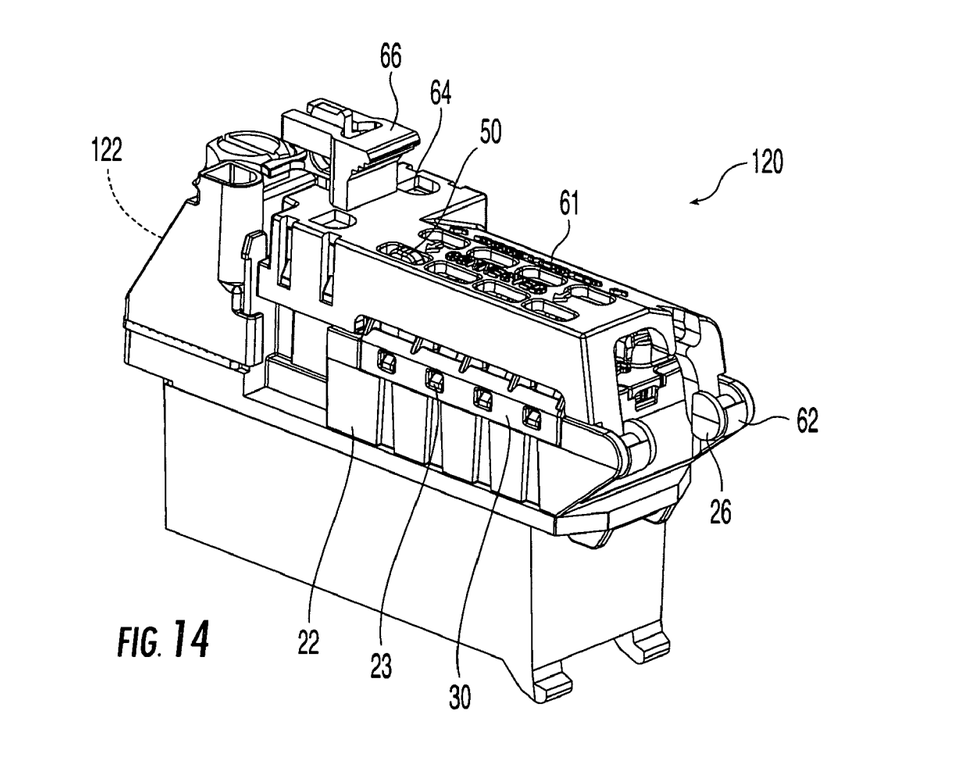
FIG. 14 is a perspective view of a customer bridge constructed in accordance with the invention removably mounted on a conventional telephone PTD.

As illustrated in FIGS. 13 and 14, customer bridge 20 may be removably mounted to any terminating device, such as a conventional telephone line module 110 or a PTD 120, respectively. Line module 110 typically comprises some type of electronic circuitry, such as a half-ringer, interconnected between the service provider wiring and the subscriber wiring. A plurality of line modules 110 are typically housed in side-by-side relation within a NID or BET having separate protection elements. Customer bridge 20 is secured to line module 110 by mounting tab 28 provided on the underside of base 22. When line module 110 is housed within the NID or BET, cover 60 of customer bridge 20 may be rotated from the closed position (as shown) to the opened position, or may be completely removed to provide access to wire insertions holes 34 and actuating arms 50. Furthermore, test ports 64 may be utilized with cover 60 in the closed position to verify the integrity of the connections between conductive wires 100 and conductive contacts 40. PTD 120 comprises service provider termination sites 122 for terminating the service provider wiring. PTD 120 typically further comprises some type of electrical protection component, such as a gas tube or MOV, interconnected between the service provider wiring and the subscriber wiring. The gas tube or MOV may be provided in place of or in addition to electronic circuitry, such as a half-ringer. A plurality of PTDs 120 are typically housed in side-by-side relation within a NID or BET. Customer bridge 20 is secured to PTD 120 by mounting tab 28 provided on the underside of base 22. When PTD 120 is housed within the NID or BET, cover 60 of customer bridge 20 may be rotated from the closed position (as shown) to the opened position, or may be completely removed to provide access to wire insertion holes 34 and actuating arms 50. Furthermore, test ports 64 may be utilized with cover 60 in the closed position to verify the integrity of the connections between conductive wires 100 and conductive contacts 40.

It should be apparent to those skilled in the art that the invention disclosed herein is susceptible to various changes without departing from the scope of invention. For example, the customer bridge disclosed herein is exemplary and is used merely to describe the basic operation of a terminating device. The skilled artisan will understand that the inventive gel disclosed herein may be useful in many other terminating devices, as well as many other communications devices, both electrical (e.g., copper conducting) or fiber optic that require protection from vibration, shock, adverse environmental conditions, and the like. Therefore, the terminating device described herein should not be considered limiting in this regard. For example, the inventive gel may be used in any other application wherein a non-fluid protective sealing gel is desired that nevertheless minimizes resistance to internal movement of components without generating an excessive restoring force. Accordingly, it is intended that the appended claims encompass any and all alternative embodiments of the invention not disclosed herein that are within the ordinary skill of a person knowledgeable in the art of electrical wiring interconnect modules and terminating devices.

That which is claimed is:

1. A terminating device comprising:
   a base;
   at least one pair of insulation displacement contacts disposed within the base;
   a wire engagement member for engaging at least one conductive wire in a corresponding one of the insulation displacement contacts;
   a protective sealing gel encapsulating the at least one pair of insulation displacement contacts, the gel having a dynamic crossover point expressed in rad/sec, and a dynamic storage modulus G' and a dynamic loss modulus G" expressed in dynes/cm$^2$; and
   wherein at any temperature between about $-40°$ C. and about $80°$ C. the dynamic crossover point of the gel is between about 1 rad/sec and about 20 rad/sec, the dynamic loss modulus G" is greater than the dynamic storage modulus G' at a shear frequency greater than the dynamic crossover point and the dynamic loss modulus G" is less than the dynamic storage modulus G' at a shear frequency less than the dynamic crossover point.

2. The terminating device according to claim 1 wherein the dynamic crossover point is between about 5 rad/sec and 20 rad/sec.

3. The terminating device according to claim 1 wherein the dynamic storage modulus G' is greater than about 800 dynes/cm$^2$ at a shear frequency less than about 0.5 rad/sec and at a temperature of about $30°$ C.

4. The terminating device according to claim 1 wherein the dynamic storage modulus G' is between about 800 dynes/cm$^2$ and about 1200 dynes/cm$^2$ at a shear frequency less than or equal to about 0.5 rad/sec and at a temperature of about $30°$ C.

5. The terminating device according to claim 4 wherein the dynamic loss modulus G" is less than about 300 dynes/cm$^2$.

6. The terminating device according to claim 1 wherein the dynamic storage modulus G' is between about 600 dynes/cm$^2$ and about 1200 dynes/cm$^2$ at a shear frequency of about 1 rad/sec at any temperature between about $-40°$ C. and about $80°$ C.

7. The terminating device according to claim 6 wherein the ratio of the dynamic loss modulus G" to the dynamic storage modulus G' (tan $\delta$=G"/G') is less than about 1.0.

8. The terminating device according to claim 1 wherein the dynamic loss modulus G" is greater than the dynamic storage modulus G' at a shear frequency of about 100 rad/sec, and wherein the ratio of the dynamic loss modulus G" to the dynamic storage modulus G' (tan $\delta$=G"/G') is greater than about 1.1.

9. The terminating device according to claim 1 wherein the gel has a relaxation time less than about 0.5 seconds at a temperature of about $30°$ C.

10. The terminating device according to claim 1 wherein the gel has an ultimate elongation greater than about 1000%.

11. The terminating device according to claim 1 wherein the gel has an ultimate breaking strength greater than about 2 psi.

12. The terminating device according to claim 1 wherein the gel has a cone penetration value expressed in tenths of a millimeter between about 255 and about 265 at about $23°$ C.

* * * * *